(12) United States Patent
Okuzu et al.

(10) Patent No.: US 8,309,217 B2
(45) Date of Patent: Nov. 13, 2012

(54) EASY ADHESION FILM

(75) Inventors: Takayoshi Okuzu, Uji (JP); Hideki Kuwata, Uji (JP)

(73) Assignee: Unitika Ltd., Hyogo (JP)

( * ) Notice: Subject to any disclaimer, the term of this patent is extended or adjusted under 35 U.S.C. 154(b) by 454 days.

(21) Appl. No.: 12/449,465

(22) PCT Filed: Feb. 12, 2008

(86) PCT No.: PCT/JP2008/000199
§ 371 (c)(1),
(2), (4) Date: Feb. 1, 2010

(87) PCT Pub. No.: WO2008/099595
PCT Pub. Date: Aug. 21, 2008

(65) Prior Publication Data
US 2010/0136328 A1    Jun. 3, 2010

(30) Foreign Application Priority Data

Feb. 13, 2007   (JP) .................................. 2007-032470
Oct. 5, 2007    (JP) .................................. 2007-262141

(51) Int. Cl.
B32B 7/02      (2006.01)
B32B 27/18     (2006.01)
B32B 27/26     (2006.01)
B32B 27/36     (2006.01)
B32B 38/00     (2006.01)

(52) U.S. Cl. ........ 428/336; 428/332; 428/339; 428/480; 428/910; 528/296; 528/302; 528/305; 528/308; 528/308.6; 528/308.7; 427/372.2; 427/384; 427/385.5; 264/288.4; 264/289.3; 264/290.2

(58) Field of Classification Search .................. None
See application file for complete search history.

(56) References Cited

U.S. PATENT DOCUMENTS

| | | | | |
|---|---|---|---|---|
| 4,752,532 A | * | 6/1988 | Starka ........................... | 428/482 |
| 4,943,623 A | * | 7/1990 | Ebert et al. .................... | 528/272 |
| 5,468,791 A | * | 11/1995 | Yuan ............................. | 524/108 |
| 5,484,842 A | * | 1/1996 | Lewarchik et al. ........... | 524/608 |
| 5,525,670 A | * | 6/1996 | Nishi et al. .................... | 524/512 |
| 5,593,733 A | * | 1/1997 | Mayo .......................... | 427/407.2 |
| 5,597,861 A | * | 1/1997 | Nakae et al. .................. | 524/601 |

(Continued)

FOREIGN PATENT DOCUMENTS

| | | |
|---|---|---|
| JP | 8-311221 | 11/1996 |
| JP | 2000-327991 | 11/2000 |
| JP | 2001-288404 | 10/2001 |
| JP | 2001-294733 | 10/2001 |

(Continued)

*Primary Examiner* — Vivian Chen
(74) *Attorney, Agent, or Firm* — Fildes & Outland, P.C.

(57) ABSTRACT

Disclosed is an easy adhesion film which attains sufficient adhesiveness in various processings without using any crosslinking agent such as a melamine resin to possibly pollute the environment and has a primer layer excellent in high-temperature hot water resistance. In the easy adhesion film, a coating film including a polyester resin and a crosslinking agent component in a content of 0.1% by mass or less, inclusive of 0% by mass, is formed on at least one side of a substrate film. The sum of the acid number and the hydroxyl number of the polyester resin is 50 to 200 mg KOH/g, wherein the acid number is 20 to 60 mg KOH/g and the hydroxyl number is 30 to 150 mg KOH/g. The amount of the oligomers contained in the polyester is 2.0% by mass or less. The thickness of the coating film is 0.001 to 0.5 µm.

7 Claims, 1 Drawing Sheet

U.S. PATENT DOCUMENTS

| | | | |
|---|---|---|---|
| 5,763,096 A * | 6/1998 | Takahashi et al. | 428/480 |
| 6,106,950 A * | 8/2000 | Searle et al. | 428/423.1 |
| 6,306,956 B1 * | 10/2001 | Spilman et al. | 524/601 |
| 6,818,699 B2 * | 11/2004 | Kajimaru et al. | 524/845 |
| 7,087,672 B2 * | 8/2006 | Yuan et al. | 524/507 |
| 2011/0081512 A1 * | 4/2011 | Noda et al. | 428/35.7 |

FOREIGN PATENT DOCUMENTS

| | | |
|---|---|---|
| JP | 2004-195741 | 7/2004 |
| JP | 2004-292577 * | 10/2004 |
| JP | 2005-053968 | 3/2005 |
| JP | 2005-336395 | 12/2005 |

* cited by examiner

EASY ADHESION FILM

TECHNICAL FIELD

The present invention relates to an easy adhesion film, in particular, an easy adhesion film suitable as a film for use in materials such as packaging materials, electrical insulating materials and general industrial materials.

BACKGROUND ART

Thermoplastic resin films are widely used as the substrate films for use in applications such as packaging of food and for use in general industrial applications. In such applications, the surface of the substrate films is usually subjected to various secondary processings such as coating with various coating materials, printing processing, vapor-deposition processing and laminating processing with other films. For such processings, there have been made attempts in which by applying to the substrate films physical treatments such as corona discharge treatment and plasma treatment or chemical treatments to activate the film surface with chemicals such as acids or alkalis, the surface modification of the substrate films is achieved to enhance the adhesion between the substrate films and the coating substances provided by the above-described secondary processings. However, the methods based on the physical treatments are simple and easy in treatment processes, but the resulting adhesion is insufficient. The methods based on the chemical treatments are complicated in treatment processes, and disadvantageously lead to adverse effects such as the deterioration of the work environment.

Aside from the above-described physical and chemical treatment methods, there is a method in which an easy adhesion coating layer (hereinafter, also referred to as a "primer layer" as the case may be) is formed in a laminated state by coating a substrate film with a primer which has adhesion activity. This method is widely applied because of the fact that this method permits selecting the components of the primer according to different top coat layers (overlayers formed by the secondary processing) and because of other reasons.

As the constituent components of the primer layer, aqueous resins are frequently used from the viewpoints of workability, safety and cost. In particular, resins such as polyurethane resin, polyester resin and acrylic resins are used for the purpose of improving the adhesion to the overlayer such as a coating layer, an ink layer or a vapor-deposition layer.

Additionally, implemented are the improvements of the performances as the primer, in particular, the improvements of the water resistance and the heat resistance by mixing various crosslinking agents with the aqueous resins. Examples of the crosslinking agents used for such purposes include isocyanate compounds and aminoplast resins (JP-56-151562 A). In JP-8-311221 A, presented is the improvement of the water-resistant adhesiveness of a vapor-deposition layer by a primer layer formed of a polyester resin and a melamine resin. In JP-8-332706 A, described is a method for obtaining an easy adhesive laminated film by using a carbodiimide monomer that contains a carbodiimide group per a molecule thereof.

The primer layers obtained by using these existing techniques tend to be degraded in the interlayer adhesion between the substrate film and the top coat layer when subjected to a high temperature hot water treatment such as boiling or retorting, disadvantageously leading to unsatisfactory practical performance as food packaging materials. Examples of the methods developed to improve the adhesiveness after the boiling or retorting treatment include a method in which an aqueous polyester resin having a glass transition temperature of 100° C. or higher and a melamine resin are used to maintain a high adhesiveness even after the retorting treatment (JP-2004-256625 A).

DISCLOSURE OF THE INVENTION

Problems to be Solved by the Invention

On the basis of the recent high concern about the environmental issues, for example, in Japan, Air Pollution Control Law was revised in May 2004, and enterprises emitting and scattering volatile organic compounds (VOCs) in the atmosphere as a result of the enterprise activities are obliged, from Apr. 1, 2006, to grasp the emission amount or the like and to suppress the emission or the like. The melamine resin used as a crosslinking agent in the polyester resin is extremely excellent in the solution stability and the properties and the like after the crosslinking. However, when a water-soluble melamine resin is used as a crosslinking agent, formaldehyde classified as a VOC comes to be generated from the melamine resin to possibly pollute the environment. Moreover, formaldehyde has been reported to be a causative substance of sick house syndrome and to be a carcinogenic substance. Consequently, the development of formalin-free commercial products is demanded in various fields.

An object of the present invention is to provide an easy adhesion film which is excellent in adhesiveness in various processings and has a primer layer excellent in high temperature hot water resistance without using any crosslinking agent such as a melamine resin.

Means for Solving the Problems

The present inventors made a diligent study on the acid number, the hydroxyl number and the amount of the oligomers of the polyester resin used as a coating film that forms the primer layer, and consequently discovered that by controlling the above-described acid number, hydroxyl number and amount of the oligomers, the surface properties of the coating film is improved without using any crosslinking agent, and the adhesiveness of the coating film and the properties, under high humidities, of the coating film are thereby improved.

The gist of the present invention is as follows.

(1) An easy adhesion film, wherein: a coating film including a polyester resin and a crosslinking agent component in a content of 0.1% by mass or less, inclusive of 0% by mass, is formed on at least one side of a substrate film; the sum of the acid number and the hydroxyl number of the polyester resin is 50 to 200 mg KOH/g, the acid number being 20 to 60 mg KOH/g and the hydroxyl number being 30 to 150 mg KOH/g; the amount of the oligomers contained in the polyester is 2.0% by mass or less; and the thickness of the coating film is 0.001 to 0.5 μm.

(2) The easy adhesion film of (1), wherein the surface carboxylic acid concentration and the surface hydroxyl concentration of the coating film are both 0.005 or more, and the surface primary amine concentration of the coating film is 0.0001 or less.

(3) The easy adhesion film of (1) or (2), wherein the crosslinking agent component is a melamine compound.

(4) The easy adhesion film of any one of (1) to (3), wherein the ratio (hydroxyl number/acid number) of the hydroxyl number to the acid number of the polyester resin is 2.0 to 5.0.

(5) The easy adhesion film of any one of (1) to (4), wherein the polyester resin includes both a tricarboxylic or higher polycarboxylic acid component and a trihydric or higher polyhydric alcohol component.

(6) The easy adhesion film of (5), wherein the tricarboxylic or higher polycarboxylic acid component is trimellitic acid and the trihydric or higher polyhydric alcohol component is trimethylolpropane.

(7) A method for producing an easy adhesion film, wherein when the easy adhesion film of any one of (1) to (6) is produced: the coating film is formed by coating at least one side of the substrate film prior to orientational crystallization with an aqueous coating material including the polyester resin as a main component and the crosslinking agent component in a content of 0.1% by mass or less, inclusive of 0% by mass; and next, the substrate film is orientationally crystallized by stretching in at least one direction and by heat-treating the substrate film together with the coating film.

Advantages of the Invention

According to the present invention, there can be obtained an easy adhesion film which has an excellent adhesiveness with the overlayer even after the processing treatments such as coating, printing and vapor deposition. The adhesiveness is maintained even after the hot water treatment such as boiling or retorting. Such an easy adhesion film of the present invention can be suitably used as materials such as packaging materials, electrical insulating materials and general industrial materials. In particular, the highly adhesive film has an excellent adhesiveness even after the hot water treatment such as boiling or retorting treatment, and hence is suitable for use in food packaging.

Such excellent properties are obtained even without using as a crosslinking agent any formaldehyde-generating substance such as a melamine compound. Such a situation enables the film to offer a friendly consideration to the surrounding environment at the time of use of the film.

Further, the easy adhesion film of the present invention is obtained simply and easily by coating a substrate film with an aqueous coating material including a polyester resin. Therefore, the film thus obtained is excellent in productivity so as to offer easiness in controlling the thickness thereof and other advantages, and is thus industrially advantageous.

BEST MODE FOR CARRYING OUT THE INVENTION

The substrate film used in the easy adhesion film of the present invention is only required to be a film made of a thermoplastic resin, without being particularly limited. Examples of the method for producing the substrate film include extrusion molding, injection molding, blow molding, stretch blow molding and drawing. The substrate film may be a film formed of a single layer, or alternatively may be a film made up of a plurality of layers formed by simultaneous melt extrusion or lamination.

Specific examples of the thermoplastic resin that forms the substrate film include olefin copolymers, polyester, polyamide, styrene copolymers, vinyl chloride copolymers, acrylic copolymers and polycarbonate. Preferable among these are olefin copolymers, polyester and polyamide.

Examples of the olefin copolymers include low-, medium- or high-density polyethylene, linear low-density polyethylene, polypropylene, ethylene-propylene copolymer, ethylene-butene copolymer, ionomers, ethylene-vinyl acetate copolymer and ethylene-vinyl alcohol copolymer. Examples of the polyester include polyethylene terephthalate, polybutylene terephthalate, polyethylene terephthalate/isophthalate, polyethylene naphthalate and polylactic acid. Examples of the polyamide include nylon 6, nylon 66, nylon 610 and meta-xylylene adipamide. Examples of the styrene copolymers include polystyrene, styrene-butadiene block copolymer, styrene-acrylonitrile copolymer and styrene-butadiene-acrylonitrile copolymer (ABS resin). Examples of the vinyl chloride copolymers include polyvinyl chloride and vinyl chloride-vinyl acetate copolymer. Examples of the acrylic copolymers include polymethyl methacrylate and methyl methacrylate-ethyl acrylate copolymer. These thermoplastic resins may be used each alone or as mixtures of two or more thereof. Examples of preferable thermoplastic resins include: polyamide resins such as nylon 6, nylon 66 and nylon 46; aromatic polyester resins such as polyethylene terephthalate, polyethylene naphthalate, polytrimethylene terephthalate, polybutylene terephthalate and polybutylene naphthalate; aliphatic polyester resins such as polylactic acid; polyolefin resins such as polypropylene and polyethylene; and the mixtures of these.

These thermoplastic resins may contain, where necessary as added thereto, one or two or more additives such as a pigment, an antioxidant, an antistatic agent, an ultraviolet absorber, a lubricant and a preservative agent. The sum of the mixing amounts of these additives appropriately falls within a range from 0.001 to 5.0 parts by mass per 100 parts by mass of the resin.

In the easy adhesion film of the present invention, a reinforcing agent may be mixed in the substrate film, for the purpose of ensuring the strength when the easy adhesion film is used as packaging materials or the like. Examples of the reinforcing agent include: fibrous reinforcing agents such as glass fiber, aromatic polyamide fiber, carbon fiber, pulp and cotton linter; powdery reinforcing agents such as carbon black and white carbon; and flaky reinforcing agents such as glass flake and aluminum flake. These reinforcing agents may be used each alone or in combinations of two or more thereof. The sum of the mixing amounts of these reinforcing agents is appropriately 2 to 150 parts by mass per 100 parts by mass of the thermoplastic resin.

For the purpose of increasing the quantity of the substrate film and other purposes, the following fillers may be mixed in the substrate film: heavy or soft calcium carbonate, mica, talc, kaolin, gypsum, clay, barium sulfate, alumina powder, silica powder and magnesium carbonate. The fillers may be used each alone or in combinations of two or more thereof. The sum of the amounts of the fillers used is appropriately 5 to 100 parts by mass per 100 parts by mass of the thermoplastic resin.

Scale-like inorganic fine powders such as water swollen mica and clay may be mixed in the substrate film, for the purpose of improving the gas barrier property and other purposes. The sum of the amounts of the scale-like inorganic fine powers used is appropriately 5 to 100 parts by mass per 100 parts by mass of the thermoplastic resin.

In the present invention, the polyester resin used as the coating film is composed of a polybasic acid component and a polyhydric alcohol component and is produced by a known polymerization method. Only one type of polyester resin may be used, or alternatively two or more types of polyester resins may be used in combination. As described below, the polyester resin is preferably capable of being converted into an aqueous material.

Examples of the polybasic acid component in the polyester resin may include: aromatic dicarboxylic acids such as terephthalic acid, isophthalic acid, orthophthalic acid, naphthalene dicarboxylic acids and biphenyl dicarboxylic acids; saturated and unsaturated aliphatic dicarboxylic acids such as oxalic acid, succinic acid, succinic anhydride, adipic acid, azelaic acid, sebacic acid, fumaric acid, maleic acid, maleic anhydride, itaconic acid, itaconic anhydride, citraconic acid, citraconic anhydride and dimer acids; and alicyclic dicarboxylic acids such as 1,4-cyclohexane dicarboxylic acid, 1,3-cyclohexane dicarboxylic acid, 1,2-cyclohexane dicarboxylic acid, 2,5-norbornene dicarboxylic acid and the anhydride thereof, and tetrahydrophthalic acid and the anhydride thereof.

Trifunctional or higher polybasic acids may be used. Examples of such a polybasic acid include trimellitic acid, pyromellitic acid, benzophenone tetracarboxylic acid, trimellitic anhydride, pyromellitic anhydride, benzophenone tetracarboxylic acid anhydride, trimesic acid, ethylene glycol bis(anhydrotrimellitate), glycerol tris(anhydrotrimellitate) and 1,2,3,4-butanetetracarboxylic acid. Preferable among these is trimellitic acid from the viewpoints of the adhesiveness, water dispersibility and heat resistance. For the purpose of maintaining the water dispersibility of the resin at a satisfactory level and setting the acid number of the polyester resin and the surface carboxylic acid concentration of the coating film at the values targeted by the present invention, the trifunctional or higher polybasic acid is contained in the polybasic acid component preferably in a content of 5 to 50 mol %, more preferably 10 to 40 mol % and particularly preferably 15 to 30 mol %.

It is preferable to use the aromatic polybasic acids among the above-described polybasic acids. The content of the aromatic polybasic acid in the polybasic acid component of the polyester resin is preferably 40 mol % or more, more preferably 50 mol % or more, furthermore preferably 60 mol % or more and particularly preferably 70 mol % or more. The increase of the proportion of the aromatic polybasic acid component increases the proportion, in the resin skeleton, of the aromatic ester bond more hardly hydrolyzable than the aliphatic ester bond and the alicyclic ester bond, and hence improves the storage stability of the resin aqueous dispersion and the water resistance of the obtained resin film, and at the same time, improves the workability and the solvent resistance of the resin film.

Preferable among the above-described aromatic polybasic acids are terephthalic acid, isophthalic acid and naphthalene dicarboxylic acid from the viewpoint that the various properties such as the workability, hardness, hot water resistance, solvent resistance and weather resistance of the resin film can be improved while balance is being maintained between these properties and the various performances of the resin film as the coating film.

For the purpose of enhancing the water dispersibility of the polyester resin, a sulfo group-containing component such as 5-sodium sulfoisophthalate may also be added as a copolymerization component. However, in such a case, the water resistance of the resin film is degraded, and the adhesiveness, as targeted by the present invention, after the hot water treatment such as boiling or retorting is significantly impaired. Therefore, it is preferable not to add the sulfo group-containing component.

Examples of the polyhydric alcohol component of the polyester resin include aliphatic glycols, alicyclic glycols and ether bond-containing glycols. Examples of the aliphatic glycols include ethylene glycol, 1,2-propanediol, 1,3-propanediol, 1,4-butanediol, 2-methyl-1,3-propanediol, 1,5-pentanediol, neopentyl glycol, 1,6-hexanediol, 3-methyl-1,5-pentanediol, 1,9-nonanediol and 2-ethyl-2-butylpropanediol. Examples of the alicyclic glycols include 1,4-cyclohexanedimethanol. Examples of the ether bond-containing glycols include: diethylene glycol, triethylene glycol and dipropylene glycol; further, glycols, such as 2,2-bis(4-hydroxyethoxyphenyl)propane, obtained by adding one to a few moles of ethylene oxide or propylene oxide to each of the two phenolic hydroxyl groups of bisphenols; and polyethylene glycol, polypropylene glycol and polytetramethylene glycol.

Examples of the trifunctional or higher polyhydric alcohols include glycerin, trimethylolethane, trimethylolpropane and pentaerythritol. Preferable among these is trimethylolpropane from the viewpoints of the adhesiveness and the water dispersibility. The trifunctional or higher polyhydric alcohol is preferably contained in a content of 1 to 30 mol % in the polyhydric alcohol component for the purpose of setting the hydroxyl number of the polyester resin and the hydroxyl concentration on the coating film surface at the values specified in the present invention. The trifunctional or higher polyhydric alcohol is contained more preferably in a content of 2 to 25 mol % and particularly preferably in a content of 3 to 20 mol %.

Particularly preferable diol components among the above-described polyhydric alcohol components are ethylene glycol, 1,4-butanediol and neopentyl glycol. When these diol components are used, the total proportion of ethylene glycol, 1,4-butanediol and neopentyl glycol in the alcohol component of the polyester resin is preferably 50 mol % or more, more preferably 60 mol % or more and particularly preferably 70 mol % or more. Ethylene glycol, 1,4-butanediol and neopentyl glycol are industrially mass-produced and hence are low in price, and additionally provide a balance between the properties of the resin film. These polyhydric alcohols particularly improve the chemical resistance and the weather resistance of the resin film.

In the easy adhesion film of the present invention, the sum of the acid number and the hydroxyl number of the polyester resin that forms the coating film is required to be 50 to 200 mg KOH/g, and is preferably 60 to 150 mg KOH/g and more preferably 70 to 110 mg KOH/g. When the sum of the acid number and the hydroxyl number exceeds 200 mg KOH/g, the synthesis of the resin tends to be difficult, and the water resistance and the workability of the resin film tend to be insufficient. On the other hand, when the sum of the acid number and the hydroxyl number is less than 50 mg KOH/g, the adhesiveness, as targeted by the present invention, after applying the processing treatments such as coating, printing and vapor deposition to the easy adhesion layer tends to be impaired, and in particular, the adhesiveness after the hot water treatment such as boiling or retorting tends to be significantly impaired. The sum of the acid number and the hydroxyl number of the polyester resin can be adjusted to fall within an intended range, for example, by controlling the copolymerization amounts of the tricarboxylic or higher polycarboxylic acid component and the trihydric or higher polyhydric alcohol component.

In the easy adhesion film of the present invention, the acid number of the polyester resin that forms the coating film is required to be 20 to 60 mg KOH/g, and is preferably 25 to 50 mg KOH/g and more preferably 30 to 40 mg KOH/g. When the acid number exceeds 60 mg KOH/g, the water resistance and the workability of the resin film tend to be insufficient. On the other hand, when the acid number is less than 20 mg KOH/g, the carboxylic acid concentration in the coating film is decreased and the carboxylic acid concentration on the surface of the coating film is also relatively decreased, leading to difficulty in acquiring the below-described intended value. The acid number of the polyester resin can be adjusted to fall within an intended range, for example, by controlling the copolymerization amount of the tricarboxylic or higher polycarboxylic acid component.

In the easy adhesion film of the present invention, the hydroxyl number of the polyester resin that forms the coating film is required to be 30 to 150 mg KOH/g, and is preferably 50 to 130 mg KOH/g and more preferably 60 to 100 mg KOH/g. When the hydroxyl number exceeds 150 mg KOH/g, the water resistance and the workability of the resin film tend to be insufficient, and the synthesis of the resin comes to be difficult. On the other hand, when the hydroxyl number is less than 30 mg KOH/g, the hydroxyl terminal concentration in the coating film is decreased, and hence the hydroxyl concentration on the surface of the coating film is also relatively decreased, leading to difficulty in acquiring the below-described intended value. The hydroxyl number of the polyester resin can be adjusted to fall within an intended range, for example, by controlling the copolymerization amount of the trihydric or higher polyhydric alcohol component.

In the easy adhesion film of the present invention, while the polyester resin that forms the coating film is meeting the above-described acid number and hydroxyl number ranges, the ratio (hydroxyl number/acid number) of the hydroxyl number to the acid number of the polyester resin is preferably set at 2.0 to 5.0, more preferably 2.5 to 4.5 and most preferably 3.0 to 4.0. When the ratio of the hydroxyl number to the acid number is less than 2.0, the adhesiveness after applying the processing treatments such as coating, printing and vapor deposition to the easy adhesion layer tends to be impaired, and in particular, the adhesiveness after the hot water treatment such as boiling or retorting tends to be significantly impaired. When the ratio of the hydroxyl number to the acid number is 5.0 or more, the control of the polymerization of the polyester resin tends to be difficult.

The glass transition temperature of the polyester resin is not particularly limited; however, in view of the blocking and others of the film, the glass transition temperature of the polyester resin is preferably 20° C. or higher and more preferably 30° C. or higher.

In the easy adhesion film of the present invention, the film thickness of the coating film is required to be 0.001 to 0.5 μm, and is preferably 0.005 to 0.1 μm and more preferably 0.01 to 0.05 μm. When the thickness of the coating film is less than 0.001 μm or exceeds 0.5 μm, the adhesiveness of the easy adhesion film of the present invention, in particular, the adhesiveness after the hot water treatment such as boiling or retorting treatment is degraded. Further, when the coating film is too thick, the economic efficiency is degraded and the exterior appearance of the coating film may be impaired.

The surface carboxylic acid concentration of the coating film formed on the substrate film is preferably 0.005 or more and more preferably 0.010 to 0.200. When the surface carboxylic acid concentration is less than 0.005, the adhesiveness targeted by the present invention, in particular, the adhesiveness after the hot water treatment such as boiling or retorting treatment tends to be degraded.

For the purpose of setting the surface carboxylic acid concentration of the coating film at 0.005 or more, in addition to the method using as the polyester resin a resin having the acid number specified in the present invention, for example, a method in which corona treatment is further applied to the coating film after coating and drying may be quoted.

The surface hydroxyl concentration of the coating film formed on the substrate film is preferably 0.005 or more and more preferably 0.020 to 0.300. When the surface hydroxyl concentration is less than 0.005, the adhesiveness targeted by the present invention, in particular, the adhesiveness after the hot water treatment such as boiling or retorting treatment tends to be degraded.

For the purpose of setting the surface hydroxyl concentration of the coating film at 0.005 or more, in addition to the method using as the polyester resin a resin having the hydroxyl number specified in the present invention, for example, a method in which corona treatment is further applied to the coating film after coating and drying may be quoted.

The surface primary amine concentration of the coating film is preferably 0.0001 or less. When the primary amine concentration exceeds 0.0001, the adhesiveness targeted by the present invention, in particular, the adhesiveness after the hot water treatment such as boiling or retorting treatment tends to be degraded.

It is to be mentioned that for the purpose of setting the surface amine concentration of the coating film so as to fall within a predetermined range, a compound or a resin having an amine at the terminal or in the side chain thereof is not used. Specific examples of the compound and the resin having an amine at the terminal or in the side chain thereof include urea compounds, melamine compounds, acrylamide compounds, polyamide compounds, and the methylolated products and the methyl methylolated products of these compounds.

In the easy adhesion film of the present invention, the coating film is required not to substantially contain any crosslinking agent. In the present invention, the fact that "no crosslinking agent is substantially contained" means that the content of the crosslinking agent component is 0.1% by mass or less, inclusive of 0% by mass. It is extremely preferable for the content of the crosslinking agent component to be 0% by mass. However, it causes no problem if the crosslinking agent component is contained in a trace amount not exceeding 0.1% by mass at maximum. Examples of the crosslinking agent required not to be substantially contained include isocyanate compounds, melamine compounds, urea compounds, epoxy compounds, carbodiimide compounds, oxazoline compounds and polyethyleneimine compounds. As described below, the coating film is preferably formed by coating the substrate film with an aqueous coating material including the polyester resin as a main component. The above-described crosslinking agents are known to effectively crosslink the polyester resin so as to impart the coating film the water resistance and the adhesiveness under the conditions that the crosslinking agents are allowed to directly react with the polyester resin. However, when the crosslinking agents are mixed in the aqueous coating material, the crosslinking agents react with the water in the coating material, and crosslinking agents react with each other, and accordingly there occurs a tendency that the adhesiveness and the water resistance of the coating film are impaired. Such a tendency is remarkable particularly when, among the crosslinking agents, used are the melamine crosslinking agents and the isocyanate crosslinking agents which possibly have amine terminal structure after the crosslinking reaction. Therefore, it is particularly preferable not to use the melamine crosslinking agents and the isocyanate crosslinking agents among the above-described crosslinking agents.

No substantial inclusion of the crosslinking agent component allows to avoid the use of formaldehyde-generating substances such as melamine compounds, and accordingly can offer a friendly consideration to the environment.

The number average molecular weight of the polyester resin is preferably 500 or more and 7000 or less, more preferably 1000 or more and 6000 or less and particularly preferably 2000 or more and 5000 or less. When the number average molecular weight is less than 500, the workability of the resin film tends to be degraded, and in particular, the solvent resistance tends to be remarkably degraded, the polyester may possibly dissolved by the organic solvent used at the time of printing processing or laminating processing, leading to a cause for troubles in the processing. On the contrary, when the number average molecular weight exceeds 7000, the production of the polyester having the targeted acid number and the targeted hydroxyl number tends to be difficult; additionally, when the polyester resin is converted into an aqueous dispersion, the viscosity of the aqueous dispersion is increased and the stability of the aqueous dispersion tends to be degraded. The number average molecular weight of the polyester resin can be derived on the basis of a GPC (gel permeation chromatography) analysis by the below-described method.

The oligomers of the polyester resin are described. The oligomers are the low molecular weight components generated at the time of polymerization reaction to produce the polymer, and are formed by polymerizing a finite number of monomers. General oligomers of a polyester are those compounds which are produced in a chain-like or cyclic form by polymerizing about two to six of the polyester monomers each composed of the polybasic acid and the polyhydric alcohol composing the polyester resin. The molecular weight of such an oligomer is varied depending on the types of the polybasic acid and polyhydric alcohol as the materials for the polyester resin and the polymerization degree of the targeted polyester resin, and is about 100 to 2000 in terms of the number average molecular weight. In the present invention, the oligomers of the polyester resin are defined as the components based on the peak appearing independently of the targeted polymer on the side of the lower molecular weight than that of the targeted polymer. The amount of such oligomers can be measured by the below-described analytical method.

In the present invention, the amount of the oligomers contained in the polyester resin is required to be 2.0% by mass or less, and is more preferably 1.5% by mass or less and most preferably 1.0% by mass or less. When the amount of the oligomers exceeds 2.0% by mass, the surface carboxylic acid concentration and the surface hydroxyl concentration of the coating film tend to be decreased. Consequently, the adhesiveness after applying the processing treatments such as coating, printing and vapor deposition to the coating film as the easy adhesion layer is impaired, and in particular, the adhesiveness after the hot water treatment such as boiling or retorting tends to be significantly impaired.

The method for reducing the oligomers in the polyester resin is not particularly limited; examples of such a method include a method in which a polyester polymerized by a known method is brought into contact with a liquid organic solvent under normal temperature and normal pressure to remove the oligomers, and a method in which an emulsion of a polyester prepared by using an aqueous medium is allowed to stand still, and the precipitate generated with the elapse of time is appropriately removed by filtration, decantation or the like. In the present invention, preferable is the method which is small in the environmental load and is capable of removing the oligomers by a simple and easy treatment in such a way that the emulsion is allowed to stand still and the precipitate generated with the elapse of time is appropriately removed by filtration, decantation or the like. The precipitate is composed of cyclic oligomers such as terephthalic acid/ethylene glycol oligomers, terephthalic acid/neopentyl glycol oligomers and isophthalic acid/neopentyl glycol oligomers. Such oligomers are high in crystallizability and have no terminal groups, and hence tend to deposit and precipitate in the emulsion. The still-standing conditions are not particularly limited; however, for example, it is appropriate to set the still-standing temperature at 5 to 25° C. and the still-standing time at 10 to 1000 hours.

In the present invention, the acid number and the hydroxyl number and the oligomer amount of the polyester resin used as the coating film are required to simultaneously fall within the above-described ranges. For the purpose of improving the adhesion of the coating film to the overlayer, it is important to improve the surface carboxylic acid concentration and the surface hydroxyl concentration of the coating film. However, when the amount of the oligomers contained in the polyester resin is large, the oligomers bleed out on the surface of the coating film, and consequently the surface carboxylic acid concentration and the surface hydroxyl concentration of the coating film are relatively decreased. Accordingly, it is important to reduce the amount of the oligomers so as to fall within a specified range, in addition to the enhancement of the acid number and the hydroxyl number of the polyester resin that forms the coating film.

In the present invention, for the purpose of forming on the substrate film the coating film that contains a polyester resin, the following method is preferable because of being simple and easy: the polyester resin is converted into an aqueous dispersion, and then the substrate film is coated with an aqueous coating material that contains the aqueous dispersion as a main component.

The preferable aqueous dispersion of the polyester resin in the present invention is an aqueous dispersion prepared by dispersing the polyester resin together with a basic compound added to the polyester resin. The basic compound neutralizes the carboxylic acid in the polyester resin to produce the carboxyl anion, and the polyester resin is stably dispersed due to the electric repulsive force between the anions. If an amine component remains in the coating film after the formation of the resin film, the adhesiveness as targeted by the present invention, in particular, the adhesiveness after the hot water treatment such as boiling or retorting treatment is degraded; therefore, the basic compound to be added is preferably an organic amine having a boiling point of 250° C. or lower, preferably, 160° C. or lower, or ammonia. Examples of the organic amine preferably used include triethylamine, N,N-diethylethanolamine, N,N-dimethylethanolamine, aminoethanolamine, N-methyl-N,N-diethanolamine, isopropylamine, iminobispropylamine, ethylamine, diethylamine, 3-ethoxypropylamine, 3-diethylaminopropylamine, sec-butylamine, propylamine, methylaminopropylamine, dimethylaminopropylamine, methyl iminobispropylamine, 3-methoxypropylamine, monoethanolamine, diethanolamine, triethanolamine, morpholine, N-methylmorpholine and N-ethylmorpholine. It is preferable to use, in particular, ammonia, triethylamine and N,N-dimethylethanolamine.

The solid content concentration of the polyester resin in the aqueous coating material may be appropriately varied according to the specifications of the coating device and the drying-heating device. However, if the aqueous coating material is a too dilute solution, the drying step disadvantageously tends to take a long time. On the other hand, if the concentration of the coating material is too high, a uniform coating material is hardly obtained, and the coatability tends to undergo problems. From these viewpoints, the solid content concentration of the polyester resin in the aqueous coating material is preferably set to fall within a range from 3 to 30% by mass.

A surfactant may be added to the aqueous coating material, in addition to the polyester resin as the main component, for the purpose of improving the coatability at the time of coating the substrate film with the coating material. Such a surfactant is an agent to promote the wetting of the substrate film by the aqueous coating material. Examples of the surfactant may include: anionic surfactants such as polyethylene alkyl phenyl ether, polyoxyethylene fatty acid ester, glycerin fatty acid ester, fatty acid metal soaps, alkyl sulfates, alkyl sulfonates and alkyl sulfosuccinates; and nonionic surfactants such as acetylene glycol. The surfactant is preferably contained in the aqueous coating material in a content of 0.01 to 1% by mass. From the reasons that the surfactant, similarly to the oligomers, bleeds out to relatively decrease the surface carboxylic acid concentration and the surface hydroxyl concentration, the surfactant is most preferably a compound to volatilize at the heat treatment temperature in the step of drying the film. When the surfactant remains in the coating film, the content of the remaining surfactant is preferably within a range from 0.1 to 5% by mass.

Inorganic or organic particles may be added to the aqueous coating material, for the purpose of imparting blocking resistance to the easy adhesion film. Examples of the materials for inorganic particles include calcium carbonate, magnesium carbonate, calcium oxide, zinc oxide, magnesium oxide, silicon oxide, silicate soda, aluminum hydroxide, iron oxide, zirconium oxide, barium sulfate, titanium oxide and carbon black. Examples of the materials for organic particles include acrylic crosslinked polymer, styrene crosslinked polymer, phenolic resin, nylon resin and polyethylene wax. The particle size of the inorganic or organic particles is preferably 0.0001 to 5 µm and more preferably 0.01 to 1 µm. The addition amount of such particles is preferably 0 to 1.0% by mass in the aqueous coating material, and the content of such particles in the obtained coating film is preferably within a range from 0 to 10% by mass.

Coating the substrate film with the aqueous coating material may be conducted at an optional stage in the production process of the substrate film. However, such coating is preferably conducted for the substrate film before the completion of the orientational crystallization. Examples illustrating the "substrate film before the completion of the crystal orientation" include an unstretched film and a uniaxially oriented film obtained by orienting an unstretched film in either one direction of the longitudinal and transverse directions. Preferably, after such a substrate film has been coated with the aqueous coating material, the substrate film is stretched together with the coating film in at least one direction and then thermally fixed. The stretching method may be appropriately varied according to the properties of the thermoplastic resin used; examples of the usable stretching method include a tenter-based simultaneous biaxial stretching method and a tenter-based successive biaxial stretching method.

The method for coating the substrate film with the aqueous coating material is not particularly limited; examples of the usable coating method include the following common methods: gravure roll coating, reverse roll coating, wire bar coating and air knife coating.

The easy adhesion film of the present invention is excellent in the adhesion to the secondary processing agents such as a coating material and a printing ink applied to the film surface, and also excellent in the adhesion to a sealant film, and accordingly capable of serving many uses as substrate films for use in packaging and general industrial applications.

Additionally, the easy adhesion film of the present invention has the excellent adhesiveness even after the hot water treatment such as boiling or retorting treatment, and hence is suitably usable particularly in the field of packaging boil-in-pouch food and retort pouch food.

EXAMPLES

Hereinafter, the present invention is described in detail with reference to Examples. It is to be noted that, in the present invention, the measurement methods of the various physical and chemical properties and the evaluation methods of the effects are as follows.

(1) Glass Transition Temperature (Tg) of Polyester Resin

A sample of 10 mg of polyester resin was measured with a DSC (differential scanning calorimetry) apparatus (DSC7, manufactured by PerkinElmer Inc.) under the condition of a temperature rise rate of 10° C./min. The glass transition temperature (Tg) was obtained by determining the midpoint temperature between the two inflection point temperatures due to the glass transition in the obtained temperature rise curve.

(2) Acid Number of Polyester Resin

In 50 ml of a mixed solvent of water/dioxane (10/1 by volume), 1 g of a polyester resin was dissolved, and the thus obtained solution was titrated with KOH in the presence of cresol red as an indicator; the number of milligrams of KOH consumed for neutralization was converted into a value per 1 g of the polyester resin as the acid number of the polyester resin.

(3) Hydroxyl Number of Polyester Resin

First, 3 g of a polyester resin was accurately weighed out. To the polyester resin, 0.6 ml of acetic anhydride and 50 ml of pyridine were added and the resulting mixture was allowed to react under stirring at room temperature for 48 hours. Successively, 5 ml of distilled water was added to the reaction mixture and the resulting reaction mixture was allowed to react further for 6 hours at room temperature under continuous stirring to completely convert the fraction, unconsumed in the above-described reaction, of the acetic anhydride into acetic acid. To the resulting solution, 50 ml of dioxane was added, and the solution was titrated with KOH in the presence of cresol red and thymol blue as the indicators. From the amount ($W_1$) of KOH consumed for neutralization and the amount (calculated value: $W_0$) of KOH to be required for neutralization of the acetic acid assumed to be obtained from the complete conversion of the acetic anhydride initially fed and assumed to remain unreacted with the polyester resin, the difference ($W_0$-$W_1$) was obtained in terms of the number of milligrams of KOH, and the difference thus obtained was divided by the number of grams of the polyester resin to yield the hydroxyl number.

(4) Number Average Molecular Weight of Polyester Resin

The number average molecular weight relative to polystyrene standards was determined by GPC analysis (using a solution delivery unit, Model LC-10ADvp, and an ultraviolet-visible spectrophotometer manufactured by Shimadzu Corp.; detection wavelength: 254 nm; solvent: tetrahydrofuran).

(5) Amount of Oligomers in Polyester Resin

Figure 1:
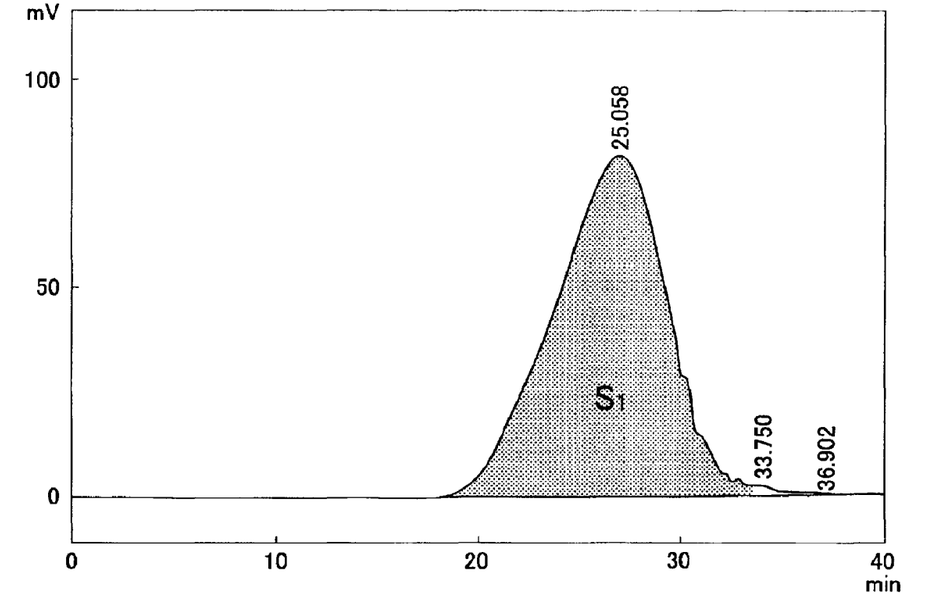
FIG. 1 is a chart showing the area $S_1$ in a GPC analysis of a polyester resin.

The amount of the oligomers contained in a polyester resin was derived from the molecular weight chart obtained by the above-described GPC analysis. In the present invention, the molecular weight peak on the lower molecular weight side of the peak forming the main molecular weight distribution of the polyester resin was defined as the molecular weight peak due to the oligomers; and the ratio of the area of the oligomer peak thus defined to the total peak area of the chart was derived. The areas represented in the molecular weight chart reflected the concentrations of the respective components in terms of the molecular weights relative to the polystyrene standards, and hence the amount of the oligomers was represented in terms of percent by mass. With reference to FIG. 1, the oligomer amount is specifically described. FIG. 1 is a molecular weight chart in the GPC analysis of the polyester resin used in below-described Example 1. In the chart, the main peak of the polyester resin appears at a peak time of 25.058 min, and the peak originating from the oligomers appears at a peak time of 33.750 min. The peak appearing at 36.902 min is identified as the peak of tetrahydrofuran used as the solvent. In the present invention, from the total area (S) of the polyester resin including the oligomers in the molecular weight chart obtained by GPC analysis and the area $(S_1)$, obtained by vertical partitioning, of the polyester peak that formed the main molecular weight distribution of the polyester resin, the amount of the oligomers was obtained by using the following formula.

Amount of oligomers [% by mass]=$(S–S_1)/S \times 100$ (6) Surface Carboxylic Acid Concentration, Surface Hydroxyl Concentration and Surface Primary Amine Concentration of the Coating Film

[Measurement Conditions]

Measurement was conducted by using an ESCA apparatus (X-ray photoelectron spectroscopic analyzer), model KRATOS AXIS-HSi manufactured by Shimadzu Corp. under the following conditions.

X-ray source: Al Kα line
X-ray output: 150 W
Photoelectron take-out angle: 90° to sample surface
Binding energy: Shift correction was applied by setting the C1s spectrum at 285.0 eV

[Measurement Method of Surface Carboxylic Acid Concentration]

The film forming a coating film was cut to an appropriate size, and subjected to a chemical modification of COOH based on a vapor-phase chemical modification method. For the chemical modification, trifluoroethanol (TFE) was used. In a vial bottle containing TFE, dicyclohexylcarbodiimide (DCC) and pyridine as placed therein, the sample was subjected to a vapor phase reaction with the reagent under the condition that the sample was not in contact with the reagent. The reaction formula is as follows.

$$R—COOH+CF_3CH_2OH(TFE)+C_6H_{11}NCNC_6H_{11}(DCC) \rightarrow R—COOCH_2CF_3+C_6H_{11}NHCONHC_6H_{11}$$

The reaction rate γ of the above-described reaction was calculated from the ratio of the $CF_3$ structure to the described COO structure in the C1s spectrum of a polyacrylic acid (PAA) standard sample which was reacted in the vial bottle at the same time as the film was reacted. Additionally, $C_6H_{11}NHCONHC_6H_{11}$ on the right hand side of the reaction formula remained on the sample surface as the case might be, and in such a case, the remaining ratio m was calculated on the basis of the O1s spectrum of the PAA standard sample after the chemical modification. In other words, the two oxygen atoms in $R—COOCH_2CF_3$ and the one oxygen atom in $C_6H_{11}NHCONHC_6H_{11}$ after the reaction were distinguished from each other on the basis of the waveform separation, and then the remaining ratio m was calculated from the following formula.

(numerator: oxygen originating from $C_6H_{11}NHCONHC_6H_{11}$, denominator: oxygen originating from $R—COOCH_2CF_3$)

The surface carboxylic acid concentration was calculated from the following formula as the ratio ([COOH]/[C]) of COOH to the total carbon.

$$[COOH]/[C] = ([Fls]/3)/(([Cls] - 2[Fls]/3 - 13m[Fls]/3)\gamma)$$
$$= [Fls]/((3[Cls] - 2[Fls] - 13m[Fls])\gamma)$$

It is to be noted that in the above-presented formula, [C1s] and [F1s] are respectively the atomic percentages of C and F obtained, respectively, from the C1s and F1s signals.

[Measurement Method of Surface Hydroxyl Concentration]

The chemical modification of the OH group was conducted with trifluoroacetic acid anhydride (TFAA). In a vial bottle in which the air was replaced with $N_2$, a sample and TFAA were placed and subjected to a vapor-phase reaction with each other under the condition that the sample and TFAA were not in contact with each other. The reaction formula is as follows.

The reaction rate of the chemical modification was able to be calculated from the ratio of the $CF_3$ structure to the C—O structure in the C1s spectrum of polyvinyl alcohol (PVA) which was placed in a reaction vessel at the same time as the sample was placed. In this case, the ratio ([OH]/[C]) of OH to the total carbon was calculated from the following formula.

$$[OH]/[C] = ([Fls]/3)/([Cls] - 2[Fls]/3)$$
$$= [Fls]/(3[Cls] - 2[Fls])$$

It is to be noted that in the above-presented formula, [C1s] and [F1s] are respectively the atomic percentages of C and F obtained, respectively, from the C1s and F1s signals.

[Measurement Method of Surface Primary Amine Concentration]

The chemical modification of the $NH_2$ group was conducted with pentafluorobenzaldehyde (PFB). Specifically, in a vial bottle containing PFB placed therein, a sample and PFB were subjected to a vapor-phase reaction with each other under the condition that the sample and PFB were not in contact with each other. The reaction formula is as follows.

The surface primary amine concentration was able to be calculated, as follows, as the ratio ($[NH_2]/[C]$) of the $NH_2$ to the total carbon. In the following formula, γ represents the reaction rate, and was able to be calculated from the elemental ratio between N and F of 4,4'-diaminodiphenyl ether (DADPE) which was reacted at the same time as the sample was reacted (γ=[F1s]/5[N1s]).

$$[NH_2]/[C] = ([Fls]/5)/(([Cls] - 7[Fls]/5)\gamma)$$
$$= [Fls]/((5[Cls] - 7[Fls])\gamma)$$

(7) Evaluation of the Laminate Strength of Printed Film

First, printing was conducted on the easy adhesion coating film of an easy adhesion film with a gravure roll. In this printing, two types of printing, namely, monocolor printing and multicolor printing were conducted. The monocolor printing was conducted with a white ink, and the multicolor printing was conducted by first printing with a white ink and then printing with an indigo blue ink. After printing, by using a dry laminate adhesive for use in retort applications, the printed easy adhesion films were dry laminated with an unstretched polypropylene film, then subjected to an aging recommended for the adhesive used, and thus laminate films were prepared.

The measurement of the laminate strength was conducted by measuring the peel strength as follows: from a laminate film, a 15-mm wide specimen was sampled; and the peel strength was measured by peeling the interface between the polypropylene film and the coating film of the easy adhesion film, from an end of the specimen, in an atmosphere of 20° C. and 65% RH. The measurement of the laminate strength was also conducted for the case where the laminate film was further subjected to a retorting treatment (at 120° C. and 1.8 atm, for 30 minutes).

In the above-described peeling test, on the assumption of the actual applications of packaging materials, two types of laminate strengths were measured: a first laminate strength based on an ordinary condition in which the packaged content was assumed to be restricted to a solid and a second laminate strength based on a condition in which the packaged content was assumed to be a liquid and the delamination interface was assumed to be wetted with water. Additionally, by observing the delamination interface of the film after the peeling, the adhesion between the easy adhesion film and the ink was evaluated.

The standards for the evaluation of the adhesion between the easy adhesion film and the ink are as follows.

Grade 3: The ink remains in a proportion of 50% (by area ratio; the same applicable hereinafter) or more on the easy adhesion coating film.

Grade 2: The ink remains in a proportion range of 25% or more and less than 50% on the easy adhesion coating film.

Grade 1: The ink remains in a proportion range of 1% or more and less than 25% on the easy adhesion coating film.

Grade 0: The ink remains only in a proportion of less than 1% on the easy adhesion coating film.

For practical purposes, when the laminate strength is 1 N/cm or more in the easy adhesion polyester film and the laminate strength is 1.5 N/cm or more in the easy adhesion nylon film, these films can be used without problems. Additionally, the evaluation score is preferably not lower than the "grade 1" in which the ink remains substantially on the easy adhesion coating film.

(8) Evaluation of the Laminate Strength of Vapor-Deposition Film

On the easy adhesion coating film of an easy adhesion film, Al was vapor-deposited so as for the vapor-deposition thickness to be 40 to 50 nm (400 to 500 angstroms) with an electron beam heating vapor-deposition apparatus. Thereafter, by using a dry laminate adhesive for use in general boil-in-pouch applications, the easy adhesion film was dry laminated with an unstretched low-density polyethylene film, then subjected to an aging recommended for the adhesive used, and thus a laminate film was prepared.

The measurement of the laminate strength was conducted by measuring the peel strength as follows: from the laminate film, a 15-mm wide specimen was sampled; and the peel strength was measured by peeling the film interface, from an end of the specimen, in an atmosphere of 20° C. and 65% RH, with a tensile tester (AGS-100B, manufactured by Shimadzu Corp.) on the basis of the T-peel method at a tensile speed of 300 mm/min. In the peeling test, on the assumption of the actual applications of packaging materials, the laminate strength based on an ordinary condition in which the packaged content was assumed to be restricted to a solid was measured. Additionally, by observing the delamination interface of the film after the peeling, the adhesion between the easy adhesion film and the vapor-deposition layer was evaluated.

The standards for the laminate strength evaluation are as follows.

Grade 3: The vapor-deposition layer remains in a proportion of 50% (by area ratio; the same applicable hereinafter) or more on the easy adhesion coating film.

Grade 2: The vapor-deposition layer remains in a proportion range of 25% or more and less than 50% on the easy adhesion coating film.

Grade 1: The vapor-deposition layer remains in a proportion range of 1% or more and less than 25% on the easy adhesion coating film.

Grade 0: The vapor-deposition layer remains only in a proportion of less than 1% on the easy adhesion coating film.

For practical purposes, when the laminate strength is 1 N/cm or more in the easy adhesion polyester film and the laminate strength is 1.5 N/cm or more in the easy adhesion nylon film, these films can be used without problems. Additionally, the evaluation score is preferably not lower than the "grade 1" in which the vapor-deposition layer remains on the easy adhesion coating film.

Example 1

[Production of Polyester Resin]

A polycarboxylic acid material composed of 58 mol % of terephthalic acid (TPA), 4 mol % of sebacic acid (SEA), 32 mol % of naphthalene dicarboxylic acid (NDCA) and 6 mol %, of trimellitic acid (TMA) and a polyhydric alcohol material composed of 35 mol % of ethylene glycol (EG), 29 mol % of 1,4-butanediol (BD) and 36 mol % of neopentyl glycol (NPG) were used. These materials were placed in a reactor so as to satisfy the relation (polyhydric alcohol material)/(polycarboxylic acid material)=1.13 (molar ratio), and tetrabutyl titanate was added in the reactor as a catalyst in an amount of 0.04 mol % in relation to the number of moles of the total polycarboxylic acid material. Then, the reaction mixture was heated to a temperature of 240° C. in a nitrogen atmosphere over a period of 4 hours. In this case, the generated methanol and water were distilled away. Thereafter, the pressure in the reaction system was gradually decreased and the polycondensation was allowed to proceed for 2 hours. Further, the reaction system was cooled down to 200° C. Thereafter, to the reaction system, trimellitic anhydride (TMA) was fed in an amount of 5 mol % in relation to the already used polycarboxylic acid material and trimethylolpropane (TMP) was fed in an amount of 5 mol % in relation to the already used polyhydric alcohol material, and the addition reaction was allowed to proceed for 2 hours. Thus, there was obtained a polyester resin having a composition of terephthalic acid (TPA)/sebacic acid (SEA)/naphthalene dicarboxylic acid (NDCA)/trimellitic acid (TMA)/ethylene glycol (EG)/1,4-butanediol (BD)/neopentyl glycol (NPG)/trimethylolpropane (TMP)=55/4/30/11/34/27/35/4 (molar ratio).

[Water-Compatibilization of Polyester Resin]

A stirrer (T. K. Robomix, manufactured by Tokushu Kika Kogyo Co., Ltd.) equipped with a jacketed, hermetically sealable glass vessel having an effective inner volume of 2 liters was used. In the glass vessel of the stirrer, 300 g of the above-described polyester resin, 100 g of ethylene glycol monobutyl ether, 90.3 g of a 30% aqueous ammonia and 509.7 g of distilled water were placed, and stirred at a rotation speed of a stirring blade (homodisper) set at 7,000 rpm. Next, the reaction mixture was heated by passing hot water through the jacket of the stirrer and was stirred for 60 minutes at the temperature thereof maintained at 73 to 75° C. Thereafter, while cold water was being passed through the jacket and stirring was being conducted with the rotation speed of the stirring blade decreased down to 5,000 rpm, the reaction mixture was cooled down to room temperature (about 25° C.). Then, the reaction mixture was filtered with a 300-mesh stainless steel filter to yield a polyester resin aqueous dispersion having a solid content concentration of 25% by mass. For the obtained polyester resin aqueous dispersion, the amount of the oligomers in the polyester resin was measured by GPC and found to be 1.32% by mass. Therefore, no oligomer removal step was conducted.

[Preparation of Aqueous Coating Material]

To the polyester resin aqueous dispersion obtained by the water-compatibilization based on the above-described method, an acetylene glycol surfactant, "Olfine E1004 (manufactured by Nissin Chemical Industry Co., Ltd.)" was added in an amount of 0.1 part by mass per 100 parts by mass of the polyester resin solid content, and appropriately diluted with water. Thus, an aqueous coating material having a composition including 5% by mass of the polyester resin solid content and 0.005% by mass of the surfactant was prepared.

[Production of Easy Adhesion Polyester Film]

Used was a polyethylene terephthalate (PET) which contained 0.1% by mass of silica having an average particle size of 1.0 μm and had a relative viscosity of 1.38 (measured under the conditions that the solvent used was a mixture of phenol: ethane tetrachloride (1:1 by mass), the temperature was set at 20° C. and the concentration was set at 0.5 g/100 ml). The polyethylene terephthalate was extruded from an extruder (a low compression single screw of 75 mm in diameter with L/D=45) equipped with a T-die into a sheet shape under the conditions of 280° C. and a discharge rate of 500 g/min. Successively, the sheet was brought into close contact with a casting roll with the surface temperature controlled at 18° C., and thus rapidly cooled to yield a 120-μm thick unstretched film. The unstretched film thus obtained was heated to 90° C. and stretched in the lengthwise direction by a factor of 3.3 to produce a uniaxially stretched film. The uniaxially stretched film was coated with the above-described aqueous coating material. The coated uniaxially stretched film was guided into a preheating zone while being gripped with clips, dried at 90° C., successively and continuously stretched in a heating zone set at 120° C. in the widthwise direction by a factor of 3.3, and further subjected to a heating treatment at 235° C., to yield an easy adhesion polyester film completed in crystal orientation. In this case, the thickness of the substrate polyester film was 12 μm and the thickness of the coating film was 0.04 μm. The surface carboxylic acid concentration, the surface hydroxyl concentration and the surface primary amine concentration of the coating film of the easy adhesion film were measured.

[Preparation of Printed Laminate Film]

On the coating film surface of the easy adhesion film, printing was conducted by direct gravure printing with a polyurethane ink (FineStar R39 indigo blue/R631 white, manufactured by Toyo Ink Mfg. Co., Ltd.). Thereafter, a heat treatment was applied at 80° C. for about 10 seconds. Next, the inked surface of the film was coated with a polyurethane adhesive (Dick Dry LX500/KW75, manufactured by Dainippon Ink and Chemicals, Inc.) and subjected to a heat treatment at 80° C. Thereafter, on a metal roll heated to 80° C., an unstretched polypropylene film (RXC-21, thickness: 50 μm, manufactured by Tohcello Co. Ltd.) was dry laminated on the heat-treated film with a nip pressure of 490 kPa to yield a laminate film. In the laminate film after the dry laminating, the thickness of the indigo blue inked layer and the thickness of the white inked layer were both 1 μm, and the thickness of the adhesive layer was 2 μm. Next, the laminate strengths of the film before and after the retorting treatment were measured.

[Preparation of Vapor-Deposition Laminate Film]

On the coating film surface of the easy adhesion film, Al was vapor-deposited, as described above, so as for the vapor-deposition thickness to be 40 to 50 nm (400 to 500 angstroms) with an electron beam heating vapor-deposition apparatus. Thereafter, the vapor-deposition layer was coated with a polyurethane adhesive (Dick dry LX401/SP60, manufactured by Dainippon Ink and Chemicals, Inc.) and subjected to a heat treatment at 80° C. Next, on a metal roll heated to 80° C., an unstretched low-density polyethylene film (T.U.X FCD, thickness: 50 μm, manufactured by Tohcello Co. Ltd.) was dry laminated on the heat-treated film, with a nip pressure of 490 kPa and subjected to an aging treatment at 40° C. for 7 days to yield a laminate film. The thickness of the adhesive layer after the dry laminating was 2 μm.

Example 2

The material feeding conditions in Example 1 were altered, and a polyester resin was synthesized so as to have the composition of terephthalic acid/sebacic acid/2,6-naphthalene dicarboxylic acid/trimellitic acid/ethylene glycol/1,4-butanediol/neopentyl glycol/trimethylolpropane=53/4/30/12/35/25/34/6 (molar ratio). The polyester resin was water-compatibilized in the same manner as in Example 1. The amount of the oligomers contained in the polyester resin was measured by using GPC and found to be 0.85% by mass. Therefore, no oligomer removal step was conducted. An aqueous coating material was obtained in the same manner as in Example 1. By using the aqueous coating material, an easy adhesion polyester film was obtained in the same manner as in Example 1.

Example 3

The material feeding conditions in Example 1 were altered, and a polyester resin was synthesized so as to have the composition of terephthalic acid/2,6-naphthalene dicarboxylic acid/trimellitic acid/ethylene glycol/1,4-butanediol/neopentyl glycol/trimethylolpropane=28/49/23/35/36/21/8 (molar ratio). The polyester resin was water-compatibilized in the same manner as in Example 1. The amount of the oligomers contained in the polyester resin was measured by using GPC and found to be 1.22% by mass. Therefore, no oligomer removal step was conducted. An aqueous coating material was obtained in the same manner as in Example 1. By using the aqueous coating material, an easy adhesion polyester film was obtained in the same manner as in Example 1.

Example 4

The material feeding conditions in Example 1 were altered, and a polyester resin was synthesized so as to have the composition of terephthalic acid/2,6-naphthalene dicarboxylic acid/trimellitic acid/ethylene glycol/1,4-butanediol/neopentyl glycol/trimethylolpropane=17/64/19/51/12/19/18 (molar ratio). The polyester resin was water-compatibilized in the same manner as in Example 1. The amount of the oligomers contained in the polyester resin was measured by using GPC and found to be 0.56% by mass. Therefore, no oligomer removal step was conducted. An aqueous coating material was obtained in the same manner as in Example 1. By using the aqueous coating material, an easy adhesion polyester film was obtained in the same manner as in Example 1.

Example 5

The material feeding conditions in Example 1 were altered, and a polyester resin was synthesized so as to have the composition of terephthalic acid/isophthalic acid (IPA)/sebacic acid/trimellitic acid/ethylene glycol/1,4-butanediol/neopentyl glycol=61/17/7/15/24/32/44 (molar ratio). The polyester resin was water-compatibilized in the same manner as in Example 1. The amount of the oligomers contained in the polyester resin aqueous dispersion was measured by using GPC and found to be 3.58% by mass. Therefore, the polyester resin aqueous dispersion was continuously allowed to stand still until the amount of the oligomers came to be 2% by mass or lower. At a still-standing time of 432 hours, the amount of the oligomers was found to be 0.40% by mass, and by using the aqueous dispersion thus obtained, an aqueous coating material was prepared. By using the aqueous coating material, an easy adhesion polyester film was obtained in the same manner as in Example 1.

Example 6

The material feeding conditions in Example 1 were altered, and a polyester resin was synthesized so as to have the composition of terephthalic acid/2,6-naphthalene dicarboxylic acid/trimellitic acid/ethylene glycol/1,4-butanediol/neopentyl glycol=18/71/11/63/13/24 (molar ratio). The polyester resin was water-compatibilized in the same manner as in Example 1. The oligomers were removed in the same manner as in Example 5 to yield an aqueous coating material containing the polyester having a predetermined oligomer amount. By using the aqueous coating material, an easy adhesion polyester film was obtained in the same manner as in Example 1.

Example 7

The material feeding conditions in Example 1 were altered, and a polyester resin was synthesized so as to have the composition of terephthalic acid/2,6-naphthalene dicarboxylic acid/trimellitic acid/ethylene glycol/1,4-butanediol/neopentyl glycol=28/49/23/38/38/24 (molar ratio). The polyester resin was water-compatibilized in the same manner as in Example 1. The oligomers were removed in the same manner as in Example 5 to yield an aqueous coating material containing the polyester having a predetermined oligomer amount. By using the aqueous coating material, an easy adhesion polyester film was obtained in the same manner as in Example 1.

Example 8

The material feeding conditions in Example 1 were altered, and a polyester resin was synthesized so as to have the composition of terephthalic acid/isophthalic acid/sebacic acid/trimellitic acid/ethylene glycol/1,4-butanediol/neopentyl glycol=59/16/7/18/32/28/40 (molar ratio). The polyester resin was water-compatibilized in the same manner as in Example 1. The oligomers were removed in the same manner as in Example 5 to yield an aqueous coating material containing the polyester having a predetermined oligomer amount. By using the aqueous coating material, an easy adhesion polyester film was obtained in the same manner as in Example 1.

Example 9

The material feeding conditions in Example 1 were altered, and a polyester resin was synthesized so as to have the composition of terephthalic acid/sebacic acid/2,6-naphthalene dicarboxylic acid/trimellitic acid/ethylene glycol/1,4-butanediol/neopentyl glycol=56/4/30/10/36/27/37 (molar ratio). The polyester resin was water-compatibilized in the same manner as in Example 1. The oligomers were removed in the same manner as in Example 5 to yield an aqueous coating material containing the polyester having a predetermined oligomer amount. By using the aqueous coating material, an easy adhesion polyester film was obtained in the same manner as in Example 1.

Examples 10 to 18

The substrate films of the easy adhesion films in Examples 1 to 9 were altered from polyester films to nylon films (ON). On the basis of this alternation, the method for producing easy adhesion nylon films is described below.

Used was a nylon 6 which contained 0.1% by mass of silica having an average particle size of 1.0 μm and had a relative viscosity of 3.03 (measured under the conditions that the solvent used was 96% by mass sulfuric acid, the temperature was set at 25° C. and the concentration was set at 1 g/100 ml). The nylon 6 was extruded from an extruder (a low compression single screw of 75 mm in diameter with L/D=45) equipped with a T-die into a sheet shape under the conditions of 260° C. and a discharge rate of 500 g/min. Successively, the sheet was brought into close contact with a casting roll with the surface temperature controlled at 18° C., and thus rapidly cooled to yield a 150-μm thick unstretched polyamide film. The unstretched film was guided into a water tank and controlled to have a water absorption percentage of 4.0%. Successively, the water-absorbed unstretched film was coated with any one of the aqueous coating materials used in Examples 1 to 9 and was dried at 60° C. with a dryer. Then, each of the unstretched films coated with the aqueous coating materials was guided into a simultaneous biaxial stretcher set at a preheating temperature of 225° C. and a stretching temperature of 195° C. to be biaxially stretched by a longitudinal factor of 3.0 and a transverse factor of 3.3, and further subjected to a heat treatment at 205° C. Thus, biaxially stretched easy adhesion nylon films having a thickness of about 15 were obtained. In this case, the thickness of each of the coating films was found to be 0.04 The easy adhesion nylon films were subjected to the same measurement tests as applied to the easy adhesion polyester films in Examples 1 to 9.

Comparative Examples 1 to 5

The polyester resin aqueous dispersions used in Examples 5 to 9 were not subjected to the oligomer removal step. A polyester film was coated in the same manner as in Example 1 with any one of the aqueous coating materials thus obtained, and thus easy adhesion polyester films were prepared.

Comparative Example 6

The material feeding conditions in Example 1 were altered, and a polyester resin was synthesized so as to have the composition of terephthalic acid/isophthalic acid/adipic acid (ADA)/trimellitic acid/ethylene glycol/neopentyl glycol=55/30/13/2/50/50 (molar ratio). The polyester resin was water-compatibilized in the same manner as in Example 1. The oligomers were removed in the same manner as in Example 5 to yield an aqueous coating material containing the polyester having a predetermined oligomer amount. By using the aqueous coating material, an easy adhesion polyester film was obtained in the same manner as in Example 1.

Comparative Example 7

The polyester resin aqueous dispersion used in Comparative Example 6 was not subjected to the oligomer removal step. A polyester film was coated in the same manner as in Example 1 with the aqueous coating material thus obtained, and thus an easy adhesion polyester film was prepared.

Comparative Example 8

To the aqueous coating material used in Example 5, Adeka Resin EM-0103 (manufactured by Adeka Corp., solid content concentration: 70% by mass), a methylolated melamine crosslinking agent, was added in an amount of 15 parts by mass in relation to 100 parts by mass of the polyester resin. Thereafter, the aqueous coating material was stirred with a homomixer for 2 hours to prepare a liquid material, which was used as an aqueous coating material. Otherwise in the same manner as in Example 1, an easy adhesion polyester film was prepared.

Comparative Example 9

The crosslinking agent added to the aqueous coating material was altered to an isocyanate crosslinking agent, AQ-100 (manufactured by Nippon Polyurethane Industry Co., Ltd., solid content concentration: 100% by mass). Otherwise in the same manner as in Comparative Example 8, an easy adhesion polyester film was prepared.

Comparative Example 10

The material feeding conditions in Example 1 were altered, and a polyester resin was synthesized so as to have the composition of terephthalic acid/isophthalic acid/trimellitic acid/5-sulfoisophthalic acid (SIP)/ethylene glycol/diethylene glycol (DEG)=61/31/3/5/23/77 (molar ratio). The polyester resin was water-compatibilized in the same manner as in Example 1. The oligomers were removed in the same manner as in Example 5 to yield an aqueous coating material containing the polyester having a predetermined oligomer amount. By using the aqueous coating material, an easy adhesion polyester film was obtained.

Comparative Example 11

The material feeding conditions in Example 1 were altered, and a polyester resin was synthesized so as to have the composition of terephthalic acid/isophthalic acid/trimellitic acid/5-sulfoisophthalic acid/ethylene glycol/diethylene glycol=61/33/1/5/52/48 (molar ratio). The polyester resin was water-compatibilized in the same manner as in Example 1. The oligomers were removed in the same manner as in Example 5 to yield an aqueous coating material containing the polyester having a predetermined oligomer amount. By using the aqueous coating material, an easy adhesion polyester film was obtained.

Comparative Example 12

An easy adhesion polyester film was prepared in the same manner as in Example 5 except that the thickness of the easy adhesion coating film was set at 1 μm.

Comparative Examples 13 to 24

The substrate films of the easy adhesion polyester films were altered to the same nylon films as used in Examples 10 to 18. Otherwise in the same manners as in Comparative Examples 1 to 12, easy adhesion nylon films were prepared.

Table 1 shows the composition and part of the properties of the aqueous coating material of each of Examples and Comparative Examples.

TABLE 1

| | Substrate film | Polycarboxylic acid components (molar ratio) | | | | | | | Polyhydric alcohol components (molar ratio) | | | | | Tg (°C.) | Acid number (mgKOH/g) | Hydroxyl number (mgKOH/g) | Acid number + hydroxyl number (mgKOH/g) |
|---|---|---|---|---|---|---|---|---|---|---|---|---|---|---|---|---|---|
| | | TPA | IPA | SEA | ADA | NDCA | TMA | SIP | EG | BD | NPG | DEG | TMP | | | | |
| Example 1 | PET | 55 | | 4 | | 30 | 11 | | 34 | 27 | 35 | | 4 | 32.8 | 25.1 | 81.2 | 106.3 |
| Example 2 | PET | 53 | | 4 | | 30 | 12 | | 35 | 25 | 34 | | 6 | 36.1 | 24.5 | 115.1 | 139.6 |
| Example 3 | PET | 28 | | | | 49 | 23 | | 35 | 36 | 21 | | 8 | 52.0 | 26.4 | 63.9 | 90.3 |
| Example 4 | PET | 17 | | | | 64 | 19 | | 51 | 12 | 19 | | 18 | 70.1 | 35.1 | 130.1 | 165.2 |
| Example 5 | PET | 61 | 17 | 7 | | | 15 | | 24 | 32 | 44 | | | 30.5 | 53.7 | 49.2 | 102.9 |
| Example 6 | PET | 18 | | | | 71 | 11 | | 63 | 13 | 24 | | | 68.8 | 39.0 | 32.0 | 71.0 |
| Example 7 | PET | 28 | | | | 49 | 23 | | 38 | 38 | 24 | | | 52.0 | 42.1 | 45.3 | 87.4 |
| Example 8 | PET | 59 | 16 | 7 | | | 18 | | 32 | 28 | 40 | | | 21.3 | 33.5 | 32.4 | 65.9 |
| Example 9 | PET | 56 | | 4 | | 30 | 10 | | 36 | 27 | 37 | | | 44.9 | 31.3 | 35.1 | 66.4 |
| Example 10 | ON | 55 | | 4 | | 30 | 11 | | 34 | 27 | 35 | | 4 | 32.8 | 25.1 | 81.2 | 106.3 |
| Example 11 | ON | 53 | | 4 | | 30 | 12 | | 35 | 25 | 34 | | 6 | 36.1 | 24.5 | 115.1 | 139.6 |
| Example 12 | ON | 28 | | | | 49 | 23 | | 35 | 36 | 21 | | 8 | 52.0 | 26.4 | 63.9 | 90.3 |
| Example 13 | ON | 17 | | | | 64 | 19 | | 51 | 12 | 19 | | 18 | 70.1 | 35.1 | 130.1 | 165.2 |
| Example 14 | ON | 61 | 17 | 7 | | | 15 | | 24 | 32 | 44 | | | 30.5 | 53.7 | 49.2 | 102.9 |
| Example 15 | ON | 18 | | | | 71 | 11 | | 63 | 13 | 24 | | | 68.8 | 39.0 | 32.0 | 71.0 |
| Example 16 | ON | 28 | | | | 49 | 23 | | 38 | 38 | 24 | | | 52.0 | 42.1 | 45.3 | 87.4 |

TABLE 1-continued

| | Substrate film | Polycarboxylic acid components (molar ratio) | | | | | | | Polyhydric alcohol components (molar ratio) | | | | | Tg (°C.) | Acid number (mgKOH/g) | Hydroxyl number (mgKOH/g) | Acid number + hydroxyl number (mgKOH/g) |
|---|---|---|---|---|---|---|---|---|---|---|---|---|---|---|---|---|---|
| | | TPA | IPA | SEA | ADA | NDCA | TMA | SIP | EG | BD | NPG | DEG | TMP | | | | |
| Example 17 | ON | 59 | 16 | 7 | | | 18 | | 32 | 28 | 40 | | | 21.3 | 33.5 | 32.4 | 65.9 |
| Example 18 | ON | 56 | | 4 | | 30 | 10 | | 36 | 27 | 37 | | | 44.9 | 31.3 | 35.1 | 66.4 |
| Comparative Example 1 | PET | 61 | 17 | 7 | | | 15 | | 24 | 32 | 44 | | | 30.5 | 53.7 | 49.2 | 102.9 |
| Comparative Example 2 | PET | 18 | | | | 71 | 11 | | 63 | 13 | 24 | | | 68.8 | 39.0 | 32.0 | 71.0 |
| Comparative Example 3 | PET | 28 | | | | 49 | 23 | | 38 | 38 | 24 | | | 52.0 | 42.1 | 45.3 | 87.4 |
| Comparative Example 4 | PET | 59 | 16 | 7 | | | 18 | | 32 | 28 | 40 | | | 21.3 | 33.5 | 32.4 | 65.9 |
| Comparative Example 5 | PET | 56 | | 4 | | 30 | 10 | | 36 | 27 | 37 | | | 44.9 | 31.3 | 35.1 | 66.4 |
| Comparative Example 6 | PET | 55 | 30 | | 13 | | 2 | | 50 | | 50 | | | 41.0 | 18.8 | 11.1 | 29.9 |
| Comparative Example 7 | PET | 55 | 30 | | 13 | | 2 | | 50 | | 50 | | | 41.0 | 18.8 | 11.1 | 29.9 |
| Comparative Example 8 | PET | 61 | 17 | 7 | | | 15 | | 24 | 32 | 44 | | | 30.5 | 53.7 | 49.2 | 102.9 |
| Comparative Example 9 | PET | 61 | 17 | 7 | | | 15 | | 24 | 32 | 44 | | | 30.5 | 53.7 | 49.2 | 102.9 |
| Comparative Example 10 | PET | 61 | 31 | | | | 3 | 5 | 23 | | | 77 | | 26.3 | 16.8 | 14.2 | 31.0 |
| Comparative Example 11 | PET | 61 | 33 | | | | 1 | 5 | 52 | | | 48 | | 44.5 | 7.9 | 18.1 | 26.0 |
| Comparative Example 12 | PET | 61 | 17 | 7 | | | 15 | | 24 | 32 | 44 | | | 30.5 | 53.7 | 49.2 | 102.9 |
| Comparative Example 13 | ON | 61 | 17 | 7 | | | 15 | | 24 | 32 | 44 | | | 30.5 | 53.7 | 49.2 | 102.9 |
| Comparative Example 14 | ON | 18 | | | | 71 | 11 | | 63 | 13 | 24 | | | 68.8 | 39.0 | 32.0 | 71.0 |
| Comparative Example 15 | ON | 28 | | | | 49 | 23 | | 38 | 38 | 24 | | | 52.0 | 42.1 | 45.3 | 87.4 |
| Comparative Example 16 | ON | 59 | 16 | 7 | | | 18 | | 32 | 28 | 40 | | | 21.3 | 33.5 | 32.4 | 65.9 |
| Comparative Example 17 | ON | 56 | | 4 | | 30 | 10 | | 36 | 27 | 37 | | | 44.9 | 31.3 | 35.1 | 66.4 |
| Comparative Example 18 | ON | 55 | 30 | | 13 | | 2 | | 50 | | 50 | | | 41.0 | 18.8 | 11.1 | 29.9 |
| Comparative Example 19 | ON | 55 | 30 | | 13 | | 2 | | 50 | | 50 | | | 41.0 | 18.8 | 11.1 | 29.9 |
| Comparative Example 20 | ON | 61 | 17 | 7 | | | 15 | | 24 | 32 | 44 | | | 30.5 | 53.7 | 49.2 | 102.9 |
| Comparative Example 21 | ON | 61 | 17 | 7 | | | 15 | | 24 | 32 | 44 | | | 30.5 | 53.7 | 49.2 | 102.9 |
| Comparative Example 22 | ON | 61 | 31 | | | | 3 | 5 | 23 | | | 77 | | 26.3 | 16.8 | 14.2 | 31.0 |
| Comparative Example 23 | ON | 61 | 33 | | | | 1 | 5 | 52 | | | 48 | | 44.5 | 7.9 | 18.1 | 26.0 |
| Comparative Example 24 | ON | 61 | 17 | 7 | | | 15 | | 24 | 32 | 44 | | | 30.5 | 53.7 | 49.2 | 102.9 |

Table 2 shows the rest of the properties of the aqueous coating material and the properties of the easy adhesion film of each of Examples and Comparative Examples.

TABLE 2

| | Polyester resin | | | Film thickness (μm) | Surface carboxylic acid concentration [COOH]/[C] | Surface hydroxyl concentration [OH]/[C] | Surface amine concentration [NH$_2$]/[C] |
|---|---|---|---|---|---|---|---|
| | Number average molecular weight | Oligomer amount (% by mass) | Crosslinking agent | | | | |
| Example 1 | 2610 | 1.32 | | 0.04 | 0.0055 | 0.0150 | <0.0000 |
| Example 2 | 2570 | 0.85 | | 0.04 | 0.0052 | 0.0200 | <0.0000 |
| Example 3 | 3190 | 1.22 | | 0.04 | 0.0061 | 0.0135 | <0.0000 |
| Example 4 | 2351 | 0.56 | | 0.04 | 0.0051 | 0.0213 | <0.0000 |
| Example 5 | 4436 | 0.40 | | 0.04 | 0.0108 | 0.0110 | <0.0000 |

TABLE 2-continued

| | Polyester resin | | Crosslinking agent | Film thickness (μm) | Surface carboxylic acid concentration [COOH]/[C] | Surface hydroxyl concentration [OH]/[C] | Surface amine concentration [NH$_2$]/[C] |
|---|---|---|---|---|---|---|---|
| | Number average molecular weight | Oligomer amount (% by mass) | | | | | |
| Example 6 | 2231 | 0.87 | | 0.04 | 0.0086 | 0.0071 | <0.0000 |
| Example 7 | 2952 | 0.17 | | 0.04 | 0.0101 | 0.0113 | <0.0000 |
| Example 8 | 2531 | 1.54 | | 0.04 | 0.0084 | 0.0079 | <0.0000 |
| Example 9 | 4150 | 1.46 | | 0.04 | 0.0077 | 0.0065 | <0.0000 |
| Example 10 | 2610 | 1.32 | | 0.04 | 0.0057 | 0.0155 | <0.0000 |
| Example 11 | 2570 | 0.85 | | 0.04 | 0.0050 | 0.0198 | <0.0000 |
| Example 12 | 3190 | 1.22 | | 0.04 | 0.0063 | 0.0130 | <0.0000 |
| Example 13 | 2351 | 0.56 | | 0.04 | 0.0055 | 0.0210 | <0.0000 |
| Example 14 | 4436 | 0.40 | | 0.04 | 0.0110 | 0.0105 | <0.0000 |
| Example 15 | 2231 | 0.87 | | 0.04 | 0.0083 | 0.0075 | <0.0000 |
| Example 16 | 2952 | 0.17 | | 0.04 | 0.0107 | 0.0115 | <0.0000 |
| Example 17 | 2531 | 1.54 | | 0.04 | 0.0081 | 0.0081 | <0.0000 |
| Example 18 | 4150 | 1.46 | | 0.04 | 0.0079 | 0.0068 | <0.0000 |
| Comparative Example 1 | 4436 | 3.58 | | 0.04 | 0.0043 | 0.0041 | <0.0000 |
| Comparative Example 2 | 2381 | 2.73 | | 0.04 | 0.0025 | 0.0019 | <0.0000 |
| Comparative Example 3 | 3190 | 2.14 | | 0.04 | 0.0037 | 0.0041 | <0.0000 |
| Comparative Example 4 | 2610 | 3.72 | | 0.04 | 0.0023 | 0.0025 | <0.0000 |
| Comparative Example 5 | 4150 | 3.25 | | 0.04 | 0.0031 | 0.0029 | <0.0000 |
| Comparative Example 6 | 7500 | 1.24 | | 0.04 | 0.0053 | 0.0048 | <0.0000 |
| Comparative Example 7 | 7500 | 4.22 | | 0.04 | 0.0035 | 0.0032 | <0.0000 |
| Comparative Example 8 | 4436 | 0.40 | Melamine | 0.04 | 0.0099 | 0.0095 | 0.0025 |
| Comparative Example 9 | 4436 | 0.40 | Isocyanate | 0.04 | 0.0100 | 0.0103 | 0.0018 |
| Comparative Example 10 | 7600 | 1.35 | | 0.04 | 0.0023 | 0.0025 | <0.0000 |
| Comparative Example 11 | 11200 | 1.21 | | 0.04 | 0.0015 | 0.0031 | <0.0000 |
| Comparative Example 12 | 4436 | 0.40 | | 1.00 | 0.0115 | 0.0099 | <0.0000 |
| Comparative Example 13 | 4436 | 3.58 | | 0.04 | 0.0039 | 0.0039 | <0.0000 |
| Comparative Example 14 | 2381 | 2.73 | | 0.04 | 0.0022 | 0.0021 | <0.0000 |
| Comparative Example 15 | 3190 | 2.14 | | 0.04 | 0.0041 | 0.0043 | <0.0000 |
| Comparative Example 16 | 2610 | 3.72 | | 0.04 | 0.0023 | 0.0027 | <0.0000 |
| Comparative Example 17 | 4150 | 3.25 | | 0.04 | 0.0035 | 0.0031 | <0.0000 |
| Comparative Example 18 | 7500 | 1.24 | | 0.04 | 0.0055 | 0.0046 | <0.0000 |
| Comparative Example 19 | 7500 | 4.22 | | 0.04 | 0.0032 | 0.0036 | <0.0000 |
| Comparative Example 20 | 4400 | 0.40 | Melamine | 0.04 | 0.0105 | 0.0095 | 0.0027 |
| Comparative Example 21 | 4400 | 0.40 | Isocyanate | 0.04 | 0.0100 | 0.0104 | 0.0020 |
| Comparative Example 22 | 7600 | 1.35 | | 0.04 | 0.0022 | 0.0023 | <0.0000 |
| Comparative Example 23 | 11200 | 1.21 | | 0.04 | 0.0017 | 0.0033 | <0.0000 |
| Comparative Example 24 | 4400 | 0.40 | | 1.00 | 0.0101 | 0.0097 | <0.0000 |

Table 3 shows the properties of the printed laminate film and the properties of the vapor-deposition laminate film of each of Examples and Comparative Examples.

TABLE 3

| | Before retorting treatment | | | | | | | | After retorting treatment | |
|---|---|---|---|---|---|---|---|---|---|---|
| | White ink | | | | Indigo blue-white superposition | | | | White ink | |
| | Ordinary condition | | Water-wetted | | Ordinary condition | | Water-wetted | | Ordinary condition | |
| | Laminate strength | Interface evaluation | Laminate strength | Interface evaluation | Laminate strength | Interface evaluation | Laminate strength | Interface evaluation | Laminate strength | Interface evaluation |
| Example 1 | 5.55 | 3 | 4.25 | 3 | 5.64 | 3 | 4.33 | 3 | 3.51 | 2 |
| Example 2 | 5.31 | 3 | 4.51 | 3 | 5.81 | 3 | 4.21 | 3 | 3.25 | 2 |
| Example 3 | 4.81 | 3 | 4.41 | 3 | 5.02 | 3 | 4.83 | 3 | 2.98 | 2 |
| Example 4 | 5.14 | 3 | 4.32 | 3 | 5.43 | 3 | 4.62 | 3 | 3.18 | 2 |
| Example 5 | 5.23 | 3 | 3.59 | 2 | 5.75 | 3 | 4.64 | 3 | 1.57 | 0 |
| Example 6 | 4.25 | 3 | 3.40 | 2 | 4.57 | 3 | 3.46 | 3 | 1.50 | 0 |
| Example 7 | 5.72 | 3 | 4.08 | 2 | 5.55 | 3 | 4.90 | 3 | 2.48 | 0 |
| Example 8 | 4.41 | 3 | 4.12 | 3 | 5.72 | 3 | 5.10 | 3 | 2.03 | 1 |
| Example 9 | 4.72 | 3 | 3.62 | 3 | 5.31 | 3 | 4.91 | 3 | 1.74 | 0 |
| Example 10 | 6.82 | 3 | 6.22 | 3 | 7.71 | 3 | 6.32 | 3 | 3.81 | 2 |
| Example 11 | 7.01 | 3 | 6.01 | 3 | 6.82 | 3 | 5.15 | 3 | 3.25 | 1 |
| Example 12 | 6.52 | 3 | 5.84 | 3 | 7.23 | 3 | 6.13 | 3 | 4.01 | 2 |
| Example 13 | 5.86 | 3 | 5.31 | 3 | 7.16 | 3 | 5.83 | 3 | 3.75 | 1 |
| Example 14 | 7.32 | 3 | 5.03 | 2 | 7.47 | 3 | 5.94 | 3 | 2.09 | 0 |
| Example 15 | 5.52 | 3 | 4.59 | 2 | 6.40 | 3 | 4.54 | 3 | 2.07 | 0 |
| Example 16 | 7.72 | 3 | 5.59 | 2 | 7.55 | 3 | 6.47 | 3 | 3.50 | 0 |
| Example 17 | 6.17 | 3 | 5.31 | 3 | 8.06 | 3 | 6.83 | 3 | 2.90 | 1 |
| Example 18 | 6.33 | 3 | 4.82 | 3 | 7.25 | 3 | 5.51 | 3 | 1.99 | 0 |
| Comparative Example 1 | 5.42 | 3 | 1.98 | 1 | 5.49 | 3 | 2.55 | 2 | 1.18 | 0 |
| Comparative Example 2 | 3.92 | 3 | 1.97 | 1 | 4.64 | 3 | 2.04 | 2 | 0.94 | 0 |
| Comparative Example 3 | 5.39 | 3 | 2.45 | 1 | 4.90 | 3 | 2.74 | 2 | 1.56 | 0 |
| Comparative Example 4 | 4.74 | 3 | 2.14 | 1 | 5.23 | 3 | 2.90 | 2 | 1.43 | 0 |
| Comparative Example 5 | 4.32 | 2 | 1.68 | 1 | 4.01 | 3 | 2.01 | 2 | 0.88 | 0 |
| Comparative Example 6 | 4.51 | 2 | 1.55 | 0 | 4.81 | 2 | 1.71 | 1 | 0.72 | 0 |
| Comparative Example 7 | 4.22 | 2 | 1.32 | 0 | 4.55 | 2 | 1.52 | 1 | 0.51 | 0 |
| Comparative Example 8 | 5.75 | 3 | 4.51 | 2 | 6.35 | 3 | 4.73 | 2 | 0.72 | 0 |
| Comparative Example 9 | 6.01 | 3 | 4.11 | 2 | 5.54 | 3 | 4.21 | 2 | 0.52 | 0 |
| Comparative Example 10 | 4.83 | 2 | 1.43 | 0 | 4.64 | 3 | 1.52 | 0 | 2.35 | 0 |
| Comparative Example 11 | 5.81 | 2 | 1.37 | 0 | 5.75 | 3 | 1.47 | 0 | 1.50 | 0 |
| Comparative Example 12 | 6.35 | 3 | 2.33 | 1 | 6.71 | 3 | 2.52 | 2 | 1.14 | 0 |
| Comparative Example 13 | 6.56 | 3 | 2.41 | 1 | 6.75 | 3 | 3.09 | 2 | 1.42 | 0 |
| Comparative Example 14 | 4.78 | 3 | 2.42 | 1 | 5.57 | 3 | 2.43 | 2 | 1.13 | 0 |
| Comparative Example 15 | 6.63 | 3 | 3.04 | 1 | 5.83 | 3 | 3.29 | 2 | 1.92 | 0 |
| Comparative Example 16 | 5.87 | 3 | 2.68 | 1 | 6.53 | 3 | 3.66 | 2 | 1.70 | 0 |
| Comparative Example 17 | 5.31 | 3 | 2.22 | 1 | 5.21 | 3 | 2.51 | 2 | 1.51 | 0 |
| Comparative Example 18 | 5.55 | 3 | 2.32 | 1 | 4.95 | 3 | 2.21 | 2 | 1.21 | 0 |
| Comparative Example 19 | 5.21 | 3 | 2.01 | 1 | 4.42 | 3 | 1.99 | 1 | 1.05 | 0 |
| Comparative Example 20 | 7.13 | 3 | 4.76 | 2 | 6.82 | 3 | 4.94 | 2 | 0.90 | 0 |
| Comparative Example 21 | 6.31 | 3 | 4.52 | 2 | 5.93 | 3 | 4.64 | 2 | 0.67 | 0 |
| Comparative Example 22 | 5.90 | 2 | 1.89 | 0 | 5.89 | 3 | 1.88 | 0 | 2.85 | 0 |
| Comparative Example 23 | 7.38 | 2 | 1.77 | 0 | 6.96 | 3 | 1.58 | 0 | 1.85 | 0 |

TABLE 3-continued

| | | | | | | | | | |
|---|---|---|---|---|---|---|---|---|---|
| Comparative Example 24 | 6.99 | 3 | 2.98 | 1 | 7.01 | 3 | 3.01 | 2 | 1.31 | 0 |

| | After retorting treatment | | | | | | | |
|---|---|---|---|---|---|---|---|---|
| | White ink | | Indigo blue-white superposition | | | | Vapor-deposition film | |
| | Water-wetted | | Ordinary condition | | Water-wetted | | | |
| | Laminate strength | Interface evaluation | Laminate strength | Interface evaluation | Laminate strength | Interface evaluation | Laminate strength | Interface evaluation |
| Example 1 | 3.01 | 2 | 3.85 | 2 | 3.01 | 2 | 1.86 | 2 |
| Example 2 | 2.85 | 1 | 4.02 | 2 | 2.56 | 1 | 1.75 | 2 |
| Example 3 | 2.71 | 1 | 3.88 | 2 | 2.49 | 1 | 1.91 | 2 |
| Example 4 | 2.65 | 1 | 3.29 | 2 | 2.12 | 1 | 1.73 | 2 |
| Example 5 | 1.50 | 0 | 2.55 | 1 | 2.29 | 0 | 1.87 | 2 |
| Example 6 | 1.44 | 0 | 2.16 | 0 | 1.89 | 0 | 1.57 | 1 |
| Example 7 | 2.42 | 0 | 3.14 | 2 | 3.10 | 1 | 1.97 | 2 |
| Example 8 | 1.89 | 0 | 4.64 | 2 | 2.16 | 1 | 1.68 | 2 |
| Example 9 | 1.52 | 0 | 2.72 | 1 | 2.05 | 0 | 1.77 | 2 |
| Example 10 | 3.25 | 2 | 5.31 | 3 | 4.31 | 2 | 2.45 | 2 |
| Example 11 | 2.91 | 1 | 4.81 | 3 | 3.95 | 2 | 2.21 | 2 |
| Example 12 | 3.51 | 2 | 3.88 | 2 | 3.22 | 2 | 1.85 | 2 |
| Example 13 | 3.81 | 1 | 4.01 | 2 | 3.35 | 2 | 2.05 | 2 |
| Example 14 | 2.10 | 1 | 3.52 | 1 | 3.11 | 1 | 1.95 | 2 |
| Example 15 | 2.00 | 1 | 2.95 | 1 | 2.61 | 1 | 1.78 | 2 |
| Example 16 | 3.46 | 2 | 4.26 | 3 | 4.19 | 2 | 2.35 | 2 |
| Example 17 | 2.75 | 2 | 6.44 | 3 | 3.04 | 2 | 1.88 | 2 |
| Example 18 | 1.75 | 0 | 3.41 | 2 | 2.82 | 1 | 2.12 | 2 |
| Comparative Example 1 | 0.95 | 0 | 1.35 | 0 | 1.05 | 0 | 1.38 | 2 |
| Comparative Example 2 | 0.85 | 0 | 1.12 | 0 | 1.00 | 0 | 1.14 | 1 |
| Comparative Example 3 | 0.98 | 0 | 1.78 | 0 | 1.11 | 0 | 1.22 | 2 |
| Comparative Example 4 | 0.89 | 0 | 1.43 | 0 | 1.01 | 0 | 1.18 | 1 |
| Comparative Example 5 | 0.51 | 0 | 1.52 | 0 | 0.89 | 0 | 1.19 | 1 |
| Comparative Example 6 | 0.48 | 0 | 1.21 | 0 | 0.83 | 0 | 1.51 | 2 |
| Comparative Example 7 | 0.31 | 0 | 1.05 | 0 | 0.41 | 0 | 1.32 | 1 |
| Comparative Example 8 | 0.59 | 0 | 0.98 | 0 | 0.75 | 0 | 1.96 | 3 |
| Comparative Example 9 | 0.46 | 0 | 0.62 | 0 | 0.49 | 0 | 1.90 | 3 |
| Comparative Example 10 | 0.98 | 0 | 2.74 | 0 | 0.82 | 0 | 1.76 | 2 |
| Comparative Example 11 | 0.33 | 0 | 1.18 | 0 | 0.26 | 0 | 1.32 | 1 |
| Comparative Example 12 | 0.88 | 0 | 1.23 | 0 | 1.18 | 0 | 1.78 | 1 |
| Comparative Example 13 | 1.12 | 0 | 1.65 | 0 | 1.27 | 0 | 1.51 | 2 |
| Comparative Example 14 | 1.09 | 0 | 1.38 | 0 | 1.19 | 0 | 1.32 | 2 |
| Comparative Example 15 | 1.22 | 0 | 2.21 | 0 | 1.37 | 0 | 1.64 | 2 |
| Comparative Example 16 | 1.06 | 0 | 1.73 | 0 | 1.22 | 0 | 1.43 | 2 |
| Comparative Example 17 | 1.12 | 0 | 1.61 | 0 | 1.32 | 0 | 1.33 | 1 |
| Comparative Example 18 | 0.88 | 0 | 1.41 | 0 | 0.91 | 0 | 1.64 | 2 |
| Comparative Example 19 | 0.71 | 0 | 1.22 | 0 | 0.75 | 0 | 1.53 | 2 |
| Comparative Example 20 | 0.69 | 0 | 1.26 | 0 | 0.84 | 0 | 2.01 | 3 |
| Comparative Example 21 | 0.56 | 0 | 0.74 | 0 | 0.58 | 0 | 1.98 | 3 |
| Comparative Example 22 | 1.33 | 0 | 3.59 | 0 | 0.99 | 0 | 1.79 | 2 |
| Comparative Example 23 | 0.43 | 0 | 1.51 | 0 | 0.32 | 0 | 1.52 | 2 |
| Comparative Example 24 | 0.88 | 0 | 1.55 | 0 | 1.43 | 0 | 1.81 | 2 |

Laminate strength unit: N/cm

As can be seen from the results shown in Tables 1 to 3, in each of Examples, the acid number, the hydroxyl number and the sum of the acid number and the hydroxyl number met the ranges specified in the present invention, and additionally formation of the coating film of the polyester resin having the oligomer amount of 2.0% by mass or less so as to fall within a thickness range specified in the present invention enabled to prepare an easy adhesion film having a laminate strength of 1 N/cm or more in the case of the polyester film or a laminate strength of 1.5 N/cm or more in the case of the nylon film, both before and after the retorting treatment and also after the vapor-deposition treatment. The above-described laminate strengths were able to be attained even in the examples in which the interface evaluation was graded as 0.

In Examples, even with different printing methods, the laminate strengths were found to fall within the above-described numerical value ranges satisfactory in practical applications both under the ordinary condition and under the water-wetted condition. In particular, when the polyester resin that contained trimethylolpropane (TMP) in the resin composition thereof was used, the interface evaluation and the laminate strength were found to be satisfactory.

On the contrary, Comparative Examples offered the following problems.

In each of Comparative Examples 1 to 5 and 13 to 17, the sum of the acid number and the hydroxyl number of the polyester resin met the range specified in the present invention, but the amount of the oligomers contained in the polyester resin exceeded the range specified in the present invention; consequently, the laminate strength before the retorting treatment under the water-wetted condition and the laminate strengths after the retorting treatment both under the ordinary condition and under the water-wetted condition were degraded.

In each of Comparative Examples 6 and 18, the amount of the oligomers contained in the polyester resin met the range specified in the present invention, but the sum of the acid number and the hydroxyl number of the polyester resin was smaller than the range specified in the present invention; consequently, the laminate strengths after the retorting treatment both under the ordinary condition and under the water-wetted condition were degraded.

In each of Comparative Examples 7 and 19, the sum of the acid number and the hydroxyl number of the aqueous polyester resin and the amount of the oligomers contained in the aqueous polyester resin fell outside the ranges specified in the present invention; consequently, the laminate strength before the retorting treatment under the water-wetted condition and the laminate strengths after the retorting treatment both under the ordinary condition and under the water-wetted condition were degraded.

In each of Comparative Examples 8, 9, 20 and 21, the addition of the melamine crosslinking agent and the isocyanate crosslinking agent in the aqueous coating material resulted in the high laminate strength and the aptitude for vapor deposition before the retorting treatment; however, the inclusion of the crosslinking agent in the coating film increased the surface primary amine concentration and degraded the laminate strengths after the retorting treatment both under the ordinary condition and under the water-wetted condition.

In each of Comparative Examples 10, 11, 22 and 23, the amount of the oligomers in the aqueous polyester resin met the range specified in the present invention, but the acid number, the hydroxyl number and the sum of the acid number and the hydroxyl number in the aqueous polyester resin all did not meet the ranges specified in the present invention; consequently, the surface carboxylic acid concentration in the easy adhesion coating film was degraded, and the laminate strength before the retorting treatment under the water-wetted condition and the laminate strengths after the retorting treatment both under the ordinary condition and under the water-wetted condition were degraded.

In each of Comparative Examples 12 and 24, the film thickness of the easy adhesion coating film exceeded the range specified in the present invention, and consequently the laminate strength after the retorting treatment was degraded.

The invention claimed is:

1. A film having a primer layer, wherein:
    a coating film comprising a polyester resin and a crosslinking agent component in a content of 0.1% by mass or less, inclusive of 0% by mass, is formed on at least one side of a substrate film;
    a sum of an acid number and a hydroxyl number of the polyester resin is 50 to 200 mg KOH/g, the acid number being 20 to 60 mg KOH/g and the hydroxyl number being 30 to 150 mg KOH/g;
    an amount of oligomers contained in the polyester is 2.0% by mass or less; and
    a thickness of the coating film is 0.001 to 0.5 μm.

2. The film having a primer layer according to claim 1, wherein a surface carboxylic acid concentration and a surface hydroxyl concentration of the coating film are both 0.005 or more, and a surface primary amine concentration of the coating film is 0.0001 or less.

3. The film having a primer layer according to claim 1, wherein the crosslinking agent component is a melamine compound.

4. The film having a primer layer according to claim 1, wherein a ratio (hydroxyl number/acid number) of the hydroxyl number to the acid number of the polyester resin is 2.0 to 5.0.

5. The film having a primer layer according to claim 1, wherein the polyester resin comprises both a tricarboxylic or higher polycarboxylic acid component and a trihydric or higher polyhydric alcohol component.

6. The film having a primer layer according to claim 5, wherein the tricarboxylic or higher polycarboxylic acid component is trimellitic acid and the trihydric or higher polyhydric alcohol component is trimethylolpropane.

7. A method for producing a film having a primer layer, wherein when the film having a primer layer according to claim 1 is produced:
    the coating film is formed by coating at least one side of the substrate film prior to orientational crystallization with an aqueous coating material comprising the polyester resin as a main component and the crosslinking agent component in a content of 0.1% by mass or less, inclusive of 0% by mass; and
    next, the substrate film is orientationally crystallized by stretching together with the coating film in at least one direction and by heat-treating the substrate film together with the coating film.

* * * * *